United States Patent [19]
Fixemer

[11] Patent Number: 5,752,726
[45] Date of Patent: May 19, 1998

[54] QUICK-ACTION COUPLING, IN PARTICULAR FOR REFRIGERANT LINES

[75] Inventor: Andreas Fixemer, Baden-Baden, Germany

[73] Assignee: Aeroquip Zweigniederlassung der Trinova GmbH, Baden-Baden, Germany

[21] Appl. No.: 641,897

[22] Filed: May 2, 1996

[30] Foreign Application Priority Data

May 3, 1995 [DE] Germany ............. 195 16 096.7

[51] Int. Cl.$^6$ ............. F16L 37/00; F16L 35/00
[52] U.S. Cl. ............. 285/39; 285/319; 285/317
[58] Field of Search ............. 285/39, 319, 317, 285/924

[56] References Cited

U.S. PATENT DOCUMENTS

| | | | |
|---|---|---|---|
| 4,055,359 | 10/1977 | McWethy | 285/39 |
| 4,834,423 | 5/1989 | DeLand | 285/317 |
| 4,846,506 | 7/1989 | Bocson et al. | 285/319 |
| 4,923,220 | 5/1990 | Guest et al. | 285/39 |
| 5,161,834 | 11/1992 | Norkey | 285/39 |
| 5,219,188 | 6/1993 | Abe et al. | 285/39 |
| 5,378,025 | 1/1995 | Szabo | 285/39 |
| 5,458,379 | 10/1995 | Hamada et al. | 285/39 |
| 5,496,073 | 3/1996 | Grenier | 285/39 |
| 5,553,895 | 9/1996 | Karl et al. | 285/39 |

FOREIGN PATENT DOCUMENTS 219228  3/1989  European Pat. Off. .

Primary Examiner—Eric K. Nicholson
Attorney, Agent, or Firm—Thomas, Kayden, Horstemeyer & Risley

[57] ABSTRACT

A quick-action coupling, in particular for refrigerant lines, is provided with a sleeve (1) and a nipple (2) which can be pushed thereinto, with a set of seals (5) having at least one seal (6) of elastomeric material. It has furthermore a locking device (10, 11, 15) for the coupled position between sleeve (1) and nipple (2), which locking device has a bead (15) on the nipple (2) projecting in particular radially outwards and a cage (10) mounted in the sleeve (1), with retaining fingers (11) which can be opened out and engage behind the bead. A releasing tool (25) for opening out the retaining fingers (11) of the cage (10) is provided, which tool can be fitted onto the nipple (2) and can be pushed in in the direction of the sleeve (1). There is provided on the outer circumference of the sleeve (1) a radially outwardly projecting border (30). The releasing tool (25) had a radially inwardly directed collar (29), serving as a stop. The releasing tool (25) has a sleeve-like, essentially axially extending expanding collar (31) for the retaining fingers (11), which collar forms with the projecting bead (15) of the nipple (2) a stop for limiting the drawing-off movement when releasing the quick-action coupling. There is provided on the nipple (2), in assignment to the nipple-side end of the sleeve (1), a circumferential depression (19) onto which a dust-protection ring (18) of elastomeric material is displaceably fitted.

10 Claims, 5 Drawing Sheets

QUICK-ACTION COUPLING, IN PARTICULAR FOR REFRIGERANT LINES

The invention relates to a quick-action coupling, in particular for refrigerant lines, with a sleeve and a nipple which can be pushed therinto, with a set of seals having at least one seal of elastomeric material and with a locking device for the coupled position between sleeve and nipple, which locking device has a bead on the nipple projecting in particular radially outwards and a cage mounted in the sleeve, with retaining fingers which can be opened out and engage behind the bead, and with a releasing tool for opening out the retaining fingers of the cage, which tool can be fitted onto the nipple and can be pushed in in the direction of the sleeve. Such refrigerant lines are used in particular in motor vehicle construction and serve, for example, for the purpose of connecting the various units of an air-conditioning system to one another. Quick-action couplings of this type often have a sleeve and a nipple, the nipple being connected to one end of the line and the sleeve being connected to the other end of the line. The nipple is inserted into the sleeve by a pushing-in movement. The nipple is licked in the sleeve in the completely pushed-in position, so that it normally cannot be decoupled again, but can be decoupled again using a special releasing tool. It goes without saying that the nipple and the sleeve in the coupled position must establish a fluid-tight connection of the ends of the lines which does not lose tightness even if shocks and vibrations occur on the motor vehicle.

A quick-action coupling of the type described at the beginning is known from EP 0 193 271 B1. A sleeve and a nipple which can be inserted into the latter are provided, a fluid-tight connection being achieved by using a set of seals which comprises a plurality of seals and spacers and be pushed into a recess in a continuous bore of the sleeve. Provided on the nipple is a radially outwardly projecting bead. Also belonging to a locking device is a cage which has retaining fingers which can be opened out, engage behind the bead, extend essentially slightly obliquely axially and, upon insertion of the nipple into the sleeve, spring open radially outwards by means of contact on the bead, until the bead is pushed further forward that the free end of the retaining fingers. The bead then comes to lie against the one spacer of the set of seals, and the retaining fingers spring radially inwards, so that the nipple is consequently locked in the sleeve. The cage used is punched from a piece of metal and has retaining fingers directed axially to both sides. One type of retaining finger serves for holding back the bead of the nipple. The other type of retaining finger serves for mounting the cage in the bore of the sleeve. For releasing the quick-action coupling, a releasing tool is used, which is fitted onto the side of the nipple and is displaced in the direction of the sleeve until the retaining fingers facing the bead are opened out radially outwards, so that the nipple can then be withdrawn out of the sleeve. When releasing the coupling, the nipple is drawn off out of the sleeve in a continuous drawing-off movement, so that the two parts are completely separated from each other. If there was still a residual pressure, or even an operating pressure, in the coupled line, on releasing the coupling there is the risk of the parts being driven apart by the pressure and the fitter is at risk of injury. Also disadvantageous in the case of the known coupling is that the bead is supported on the nipple by means of the set of seals on the housing of the sleeve, so that the set of seals is subjected to varying compression, depending on the forces acting, thereby also resulting in varying tightness. With the nipple introduced into the sleeve, in the coupled position, there is at the nipple-side end of the sleeve a relatively wide gap, through which dust and dirt can penetrate into the push-in space between sleeve and nipple. Furthermore, for the fitter of such a quick-action coupling it is not easy to tell whether the correctly coupled position has been reached after introducing the nipple into the sleeve. If there are bent retaining fingers on the cage, it is possible for the bead to be jammed between the retaining fingers, giving a false impression of the finally coupled position.

A further quick-action coupling is known from U.S. Pat No. 4,055,359. Here too, a sleeve and a nipple are provided. The essential element of the locking device is a garter spring which, in the coupled position, engages over an obliquely running beading on the free end of the nipple. Here too, a releasing tool is provided, which however is fitted onto the sleeve side. This releasing tool has an essentially axially extending expanding collar for the garter spring, so that when this releasing tool is appropriately used the nipple is withdrawn from the sleeve or, if pressure occurs, is driven out.

U.S. Pat. No. 5,069,424 discloses a quick-action coupling with a sleeve and a nipple which can be displaced therein. Accommodated in the sleeve is a seal which is fixed in the sleeve by means of a supporting ring which is supported on a projecting bead of the nipple. The end of the seal projecting on the sleeve in the direction of the connecting line is designed as a closing valve preventing the escape of medium in the decoupled state. Provided between sleeve and nipple is a locking device for the coupled position, the essential parts of which are the projecting bead on the nipple and a cage mounted in the sleeve, with retaining fingers which can be opened out and engage behind the bead. This cage is unreleasably mounted in the sleeve. There is also no provision for exchanging the set of seals in the case of wear. In addition to the first locking device with the cage and the retaining fingers which act on the projecting bead of the nipple, there is also provided a second locking device, serving for additional security. This second device is fitted on the nipple side onto the latter and has two axially extending continuations into the direction of the sleeve. One continuation, lying against the outside diameter of the nipple, can come into contact with the rear side of the projecting bead on the nipple in order, during a pushing-in operation, to push in still further a nipple not completely pushed into the sleeve. On reaching the intended locked in position in relation to the cage with the retaining fingers, the radially outerlying continuation of this second locking device also snaps into a grove on the outer circumference of the sleeve. For releasing the locked position between sleeve and nipple, first of all the second locking device is released, in that the continuations engaging over the sleeve are lifted out of the circumferential groove. For the actual releasing of the first locking device, an additional releasing cover is mounted displaceably and permanently in the free end of the sleeve but does not engage over the sleeve. After the releasing of the second locking device, the releasing cover can be displaced axially in the direction of the sleeve, whereby the retaining fingers of the cage are spread open and the projecting bead on the nipple consequently comes free from the retaining fingers. By pulling on the nipple or else as a result of a residual pressure trapped in the sleeve, here too the nipple is withdrawn or pressed out from the sleeve in a continuous drawing-off movement or expelling movement. Here too there is a risk of injury to the fitter during releasing if there are residual pressures in the line on the sleeve side.

EP 0 217 228 B1 shows a quick-acting coupling with a sleeve and a nipple which can be pushed into the latter.

Accommodated in the sleeve is a seal retained by a supporting ring. The supporting ring is returned by a screw nut which is screwed together with the sleeve. The nipple has a first circumferential groove, into which there can spring a slit securing ring which is mounted in the recess of the supporting ring in such a manner that it can spring open radially and is retained by the screw nut. The nipple has a second circumferential grove, into which a ring seal, acting as a dust seal, is fitted. The arrangement of the groove and of the ring seal is matched to a sloping surface on the screw nut and arranged such that, once the nipple has been introduced completely into the sleeve, the dust seal is pressed against radially.

The invention is based on the object of providing a quick-action coupling of the type described at the beginning in which the pushed-in locked seating of the nipple in the sleeve is reliably achieved and in which, on releasing, the risk of injury to the fitter when there are residual pressures in the line is reduced.

According to the invention, this is achieved in the case of a quick-action coupling of the type described at the beginning by there being provided on the outer circumference of the sleeve a radially outwardly projecting border, by the releasing tool having a radially inwardly directed collar, serving as a stop, by the releasing tool having a sleeve-like, essentially axially extending expanding collar for the retaining fingers, which collar forms with the projecting bead of the nipple a stop for limiting the drawing-off movement when releasing the quick-action coupling, and by there being provided on the nipple, in assignment to the nipple-side end of the sleeve, a circumferential depression onto which a dust-protection ring of elastomeric material is displaceably fitted.

The invention is based on the idea of indicating to the fitter the properly pushed-in state of the nipple into the sleeve, so that at the end of the pushing-in movement he is sure of having reached the correct locked seating of the nipple in the sleeve. For this purpose, the nipple has a circumferential depression, for example in the form of a flat channel, onto which a dust-protection ring of rubber is fitted. The dust-protection ring is retained in the circumferential depression, against the effect of vibrational forces, but on the other hand can be deliberately drawn off out of the depression and displaced in relation to the nipple when this is required. The dust-protection ring has a dual function. It protects the quick-action coupling in the coupled position against the penetration of dust into the interior of the sleeve, that is to say in the pushing-in space between the nipple and sleeve. On the other hand, the dust-protection ring indicates in relation to the nipple-side end of the sleeve that the end position has been reached during pushing into the coupled position. Serving for releasing is a releasing tool, which on one side has a sleeve-like, essentially axially extending expanding collar for the retaining fingers. To be able to use the releasing tool, the dust-protection ring has to be removed from the region of the nipple-side end of the sleeve, that is to say pushed back axially on the nipple, in order that the releasing tool can be fitted on. The releasing tool can be pushed in the direction of the sleeve into the pushing-in space between nipple and sleeve. Its sleeve-like expanding collar grips that retaining fingers and opens them radially outwards, so that the undercut for the bead of the nipple is overcome. It is then possible to displace the nipple, and consequently also the displacing tool, to a limited extent with respect to the sleeve, to be precise in the releasing direction of the coupling. Here, however, a continuous drawing-off movement is avoided, but instead the releasing tool can be displaced in relation to the sleeve only until its radially inwardly directed collar strikes against the projecting border of the sleeve and the drawing-off movement is ended. The parts are in this case designed and arranged in relation to one another such that, as soon as the collar strikes against the border, the front end of the nipple has also already left the set of seals, so that there is narrow gap between nipple and sleeve, through which if need be a pressure reduction can take place specifically and deliberately without being of any danger to the fitter. As a rule, the quick-action coupling is of course decoupled whenever pressure in the coupled line has been released beforehand. For completely pulling the nipple and sleeve apart, the releasing tool is taken off again, so that the nipple can be taken out of the sleeve without exerting any great force. In the intermediate position described, the nipple is supported on the sleeve by means of the expanding collar of the releasing tool.

The retaining fingers on the cage may be provided only protruding axially towards one side, an securing ring being provided for the exchangeable fixing of the cage and of the set of seals in the sleeve. This design on the one hand shortens the overall length of the quick-action coupling. One the other hand, it makes the quick-action coupling very easy to service. The parts subject to wear, for example the set of seals and/or the cage, can be exchanged very easily. The shaping of the cage is also simplified as a result.

For the axial fixing of the set of seals and for limiting the pushing-in movement of the nipple into the sleeve during coupling, there may be provided a supporting ring, the outside diameter of which is designed such that it is larger that the outside diameter of the set of seals. This has the effect of avoiding the set of seals being pushed together or influenced in terms of forces in the continued pushing-in movement. The supporting ring transfers forces from the nipple on the sleeve into the housing of the sleeve while bypassing the set of seals. In the sleeve there is provided a shoulder assigned to the supporting ring, the diameter of the shoulder being larger that the diameter of the elements of the set of seals. The inside diameter of the supporting ring is matched to the outside diameter of the nipple in the pushing-in direction ahead of the bead. Consequently, a bearing of the nipple at two points in the sleeve is achieved, so that transverse forces can have only a limited effect. Bending forces are diverted via the supporting ring, and vibratory movements of the nipple in relation to the sleeve are limited.

Various possibilities result for the design and arrangement of the dust-protection ring. The dust-protection ring may be arranged and designed in the depression such that, in the coupled state, it enters into a pushing-in space formed between the sleeve and nipple and is terminated at the end face by the sleeve. As soon as this position is reached, this indicates to the fitter that the properly locked relative position between nipple and sleeve has been assumed and consequently the pushing-in movement can be ended. It goes without saying that the dust-protection ring must be axially displaced on the nipple for putting the releasing tool in place, in order to make the entrance into the pushing-in space accessible for the sleeve-like expanding collar of the releasing tool. The dust-protection ring may, on the other hand, be arranged and designed in the depression such that, in the coupled state, at the end face it adjoins the sleeve and seals off against the penetration of dust a pushing-in space formed between sleeve and nipple. Here, the striking of the dust-protection ring must of course be mounted on the nipple such that it is axially displaceable and can be withdrawn from the depression when the releasing tool is to be fitted.

The sleeve-like expanding collar of the releasing tool has at its free end an essentially radially extending stop face which interacts with the bead of the nipple, so that even an axial force acting is not able to overcome the limitation of the withdrawing movement. As a rule, the releasing tool is of a divided design, its two parts surrounding the nipple and the sleeve in a shell-like manner, in any event over a certain section of their axial extent. Thus, the releasing tool may be made up of two half-shell bodies which can be pivoted with respect to each other, for example by means of a joint. It is also possible to use two separate half-shell bodies which put together and held together only for the purpose of their use on the nipple.

the cage with the retaining fingers may take the form of a plastics moulding, in particular a plastics injection moulding. The cage may then be provided with two types of retaining fingers. The one retaining fingers lock the bead and consequently the nipple. The other retaining fingers serve for fixing the position of the cage in the sleeve.

The invention is further explained and described with reference to preferred exemplary embodiments. In the drawing.

Figure 1:
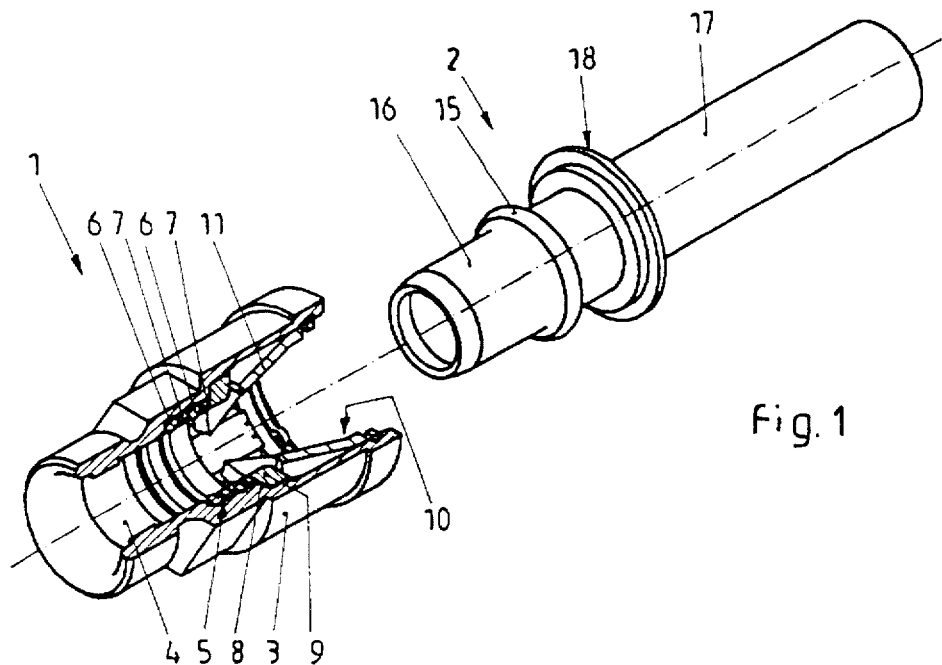
FIG. 1 shows a perspective representation of the nipple and of the sleeve of the quick-action coupling, partially in section.
Figure 2:
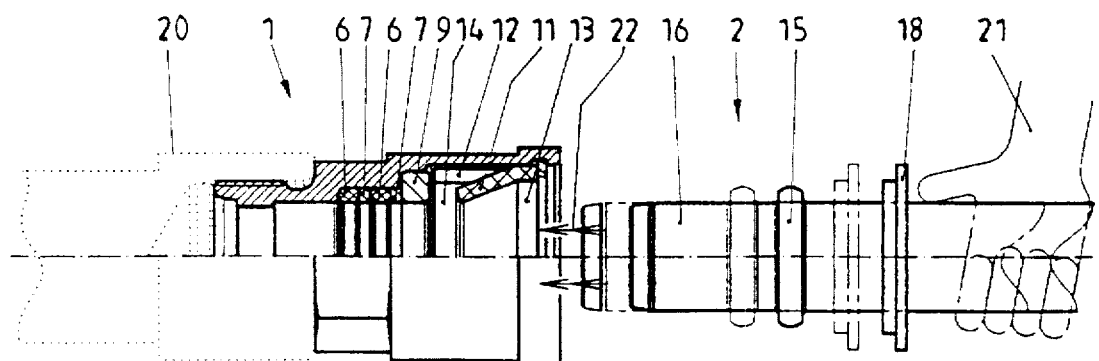
FIG. 2 shows a representation of the pushing-in movement of the nipple into the sleeve, in section in one half, in elevation in the other half.
Figure 3:
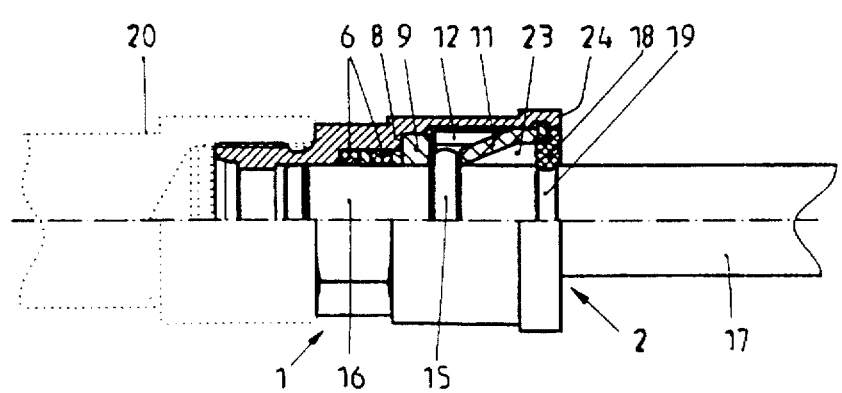
FIG. 3 shows the coupled representation between nipple and sleeve.
Figure 4:
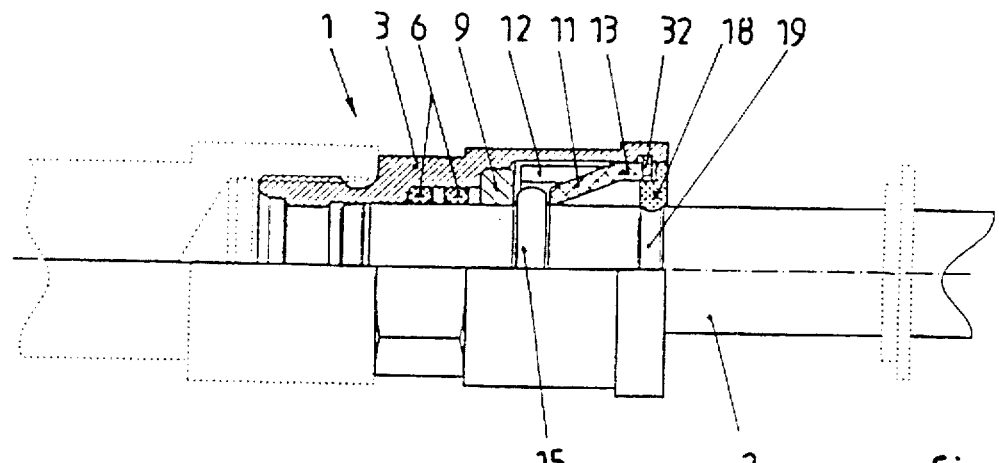
FIG. 4 shows a first step within a releasing operation prior to the axial moving of the dust-protection ring.

In FIG. 1 there are already perspectively represented the essential parts of the quick-action coupling. A sleeve 1 is fastened at one end of a refrigerant line (not shown). Located at the other end of a line to be connected thereto is a nipple 2. The sleeve 1 has a housing 3, which is designed as a stepped, hollow-cylindrical body. The housing 3 has a stepped bore 4, in which there is accommodated a set of seals 5, which has at least one seal. In the present exemplary embodiment, the set of seals 5 is made up of two seals 5 and tow spacers 7. The stepped bore 4, which continues right through the sleeve 1, forms after the set of seals 5 a shoulder 8, against which there axially bears a supporting ring 9 which has a larger outside diameter that the seal 6 and the spacer 7. Following the supporting ring 9 there is accommodated in the nipple-side end region of the sleeve 1 a cage 10, which has retaining fingers 11 and 12. The retaining fingers 11 and 12 protrude axially towards one side from an annular basic body 15. The retaining fingers 11 are arranged obliquely inclined, so that they can spring open radially outwards. The retaining fingers 12 extend axially and serve for the mounting and accommodating of the cage 10 in the bore 4 of the sleeve. The retaining fingers 12 are expediently designed such that they are longer that the retaining fingers 11, in order that a space 14 is produced between the supporting ring 9 and the free ends of the retaining fingers 11, which space serves for receiving a bead 15 which is provided projecting radially outwards in the region of the nipple 2. The nipple has a free end 16, the outside diameter of which is matched to the inside diameter of the set of seals 5, or of the seals 6 and of the spacers 7. The bead 15 extends in a corresponding axial arrangement and assignment with respect to the relevant parts of the sleeve 1 on the nipple 2. The bead 15 is preferably provided projecting radially outwards. However, the converse arrangement is also conceivable, that is to say a depression descending radially inwards with respect to the free end 16, which depression could be a component part of a locking device. Provided at a distance form the bead 15, facing a pipe 17 connected to the nipple 2, is a dust-protection ring 18, which consists of elastomeric material and is arranged and retained in a correspondingly dimensioned and arranged depression 19 (FIG. 3) of the nipple 2, but such that the dust-protection ring 18 can be withdrawn from the depression 19 and moved axially on the nipple 2. The depression 19 is arranged at an axial distance from the bead 15 which is matched to the dimensioning of the housing 3 of the sleeve 1. The sleeve 1 may be connected to a pipe 20, represented by dotted lines in FIGS. 2 and 3, for example in the form of a threaded connection carried out in a sealed manner. FIG. 3 shows the coupled state between nipple 2 and sleeve 1. FIG. 2 illustrates the coupling operation, according to which the nipple 2 is pushed into the sleeve 1. For this purpose, the dust-protection ring 18 is displaced into the depression 19 in an engaging manner, unless it is in any case retained in the depression 19. Subsequently, as FIG. 2 illustrates, the nipple 2 is grasped by the hand 21 and the free end 16 of the nipple 2 is introduced into the housing 3 of the sleeve 1 according to the arrows 22. During this, the retaining fingers 11 assume a guiding function for the front free end 16 of the nipple 2. As soon as the bead 15 comes to bear against the retaining fingers 11, a spreading-open movement of the retaining fingers 11 takes place, approximately radially outwards, so that the nipple 2 can enter further into sleeve 1 until the bead 15 has reached the space 14. At this moment, the retaining fingers 11 spring radially inwards and come to lie behind the bead 15, so that consequently the finished coupled position according to FIG. 3 is reached. During this coupling-in movement, the dust-protection ring 18 in the region of the interface of the sleeve 1 has entered into a pushing-in space 23, formed between nipple 2 and sleeve 1, and has done so in such a way that the dust-protection ring 18 aligns with the end face 24 of the housing 3 of the sleeve 1.

Figure 5:
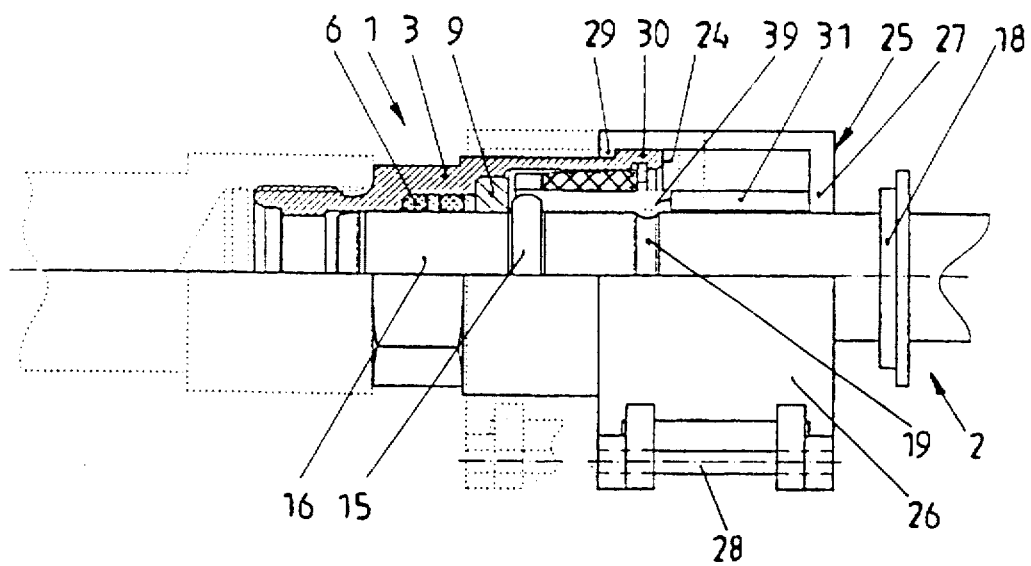
FIG. 5 shows a second step during the releasing of the coupling.

With the aid of FIGS. 4 to 7, the disassembly, that is to say the releasing of the quick-action coupling, is illustrated. First of all, FIG. 4 shows once again the coupled state. The dust-protection ring 18 is first of all moved axially on the nipple 2, that is to say is drawn out of the depression 19 and displaced in an axial direction such that it assumes approximately a position such as that which is illustrated by dotted lines in FIG. 4. Subsequently, a releasing tool 25, which may comprise two half-shell-like bodies 26 and 27, which may be articulated such that they can pivot with respect to each other at a common joint 28, is fitted on, as FIG. 5 shows. In this case, a radially inwardly directed collar 29 engages over a radially outwardly directed and projecting border 30 at the nipple-side end of the housing 3 of the sleeve 1. The releasing tool has furthermore, in assignment to the retaining fingers 11, an essentially axially and sleeve-like extending expanding collar 31, which just like the other parts of the releasing tool 25 is also make up of two half-shell-like elements, which enclose the nipple 2. The sleeve-like expending collar 31 has at its end facing the sleeve 1 an essentially radially extending stop face 39, in order that an axial force can be transferred via the bead 15 to the sleeve-like expanding collar 31 and there is no risk of the releasing tool 25 springing out radially. The releasing tool 25 is then displaced out of the position represented in FIG. 5 by solid lines into the position reproduced by dotted lines, that is to say into the sleeve 1, so that the expanding collar 31 spreads out the retaining fingers 11, as already described, radially outwards and thus there is the possibility of the bead 15 of the nipple 2 coming free from its engagement from behind by the free ends of the retaining fingers 11.

Figure 6:
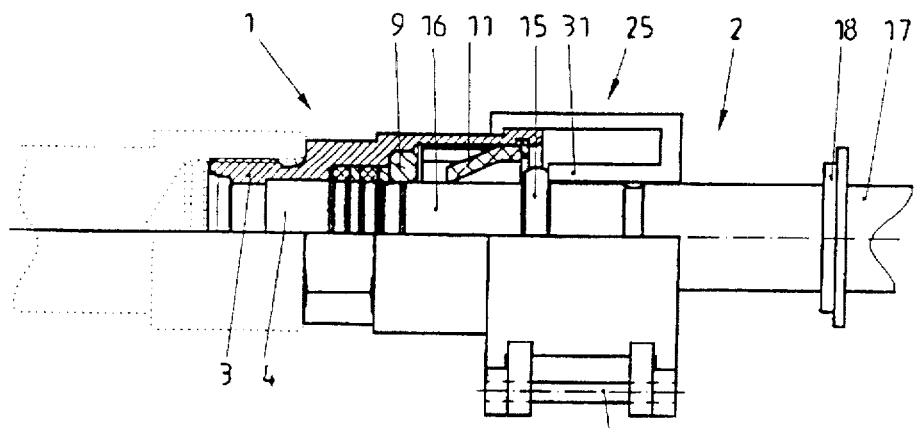
FIG. 6 shows the limitation of the withdrawing movement of the nipple from the sleeve.

The nipple 2 can consequently be withdrawn from the sleeve 1, but only over a limited distance, the end of which is represented in FIG. 6. The collar 29 thereby strikes against the border 30, so that the withdrawing movement is ended. The expanding collar 31 comes to lie against the bead 15 and prevents further withdrawal of the nipple 2 out of the sleeve 1. However, it can be seen from FIG. 6 that the front end 16 of the nipple 2 has come out of contact with the seals 16, so that now a narrow gap is formed between the nipple 2 and the continuous bore 4 of the sleeve 1, via which gap a residual pressure possibly still existing in the line can be specifically relieved and reduced without the fitter being at any risk. Thereafter, the releasing tool 25 is then taken off the nipple, whereby the collar 29 comes free from the border 30. Subsequently, the nipple 2 can be completely withdrawn from the sleeve 1, as is represented in the final position in FIG. 7.

Figure 7:
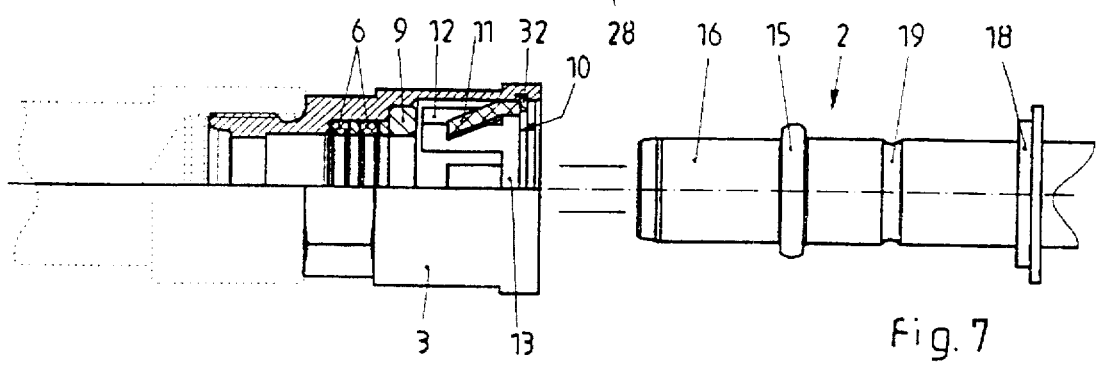
FIG. 7 shows the parts after removal of the releasing tool in complete decoupling.

It can be seen from FIG. 7 that the cage 10 with its basic body 13 and the retaining fingers 11 and 12 is retained by a securing ring 32, which is fitted into a corresponding groove in the stopped bore 4 of the housing 3 of the sleeve 1. By removing the securing ring 32, not only can the cage 10 be freely taken out, but also the supporting ring 9 and the set of seals 5 comprising the seals 6 and spacer 7. Thus, these wear-affected elements can easily be exchanged. The assembly of these elements takes place in the reverse sequence when an exchange has been necessary.

Figure 8:
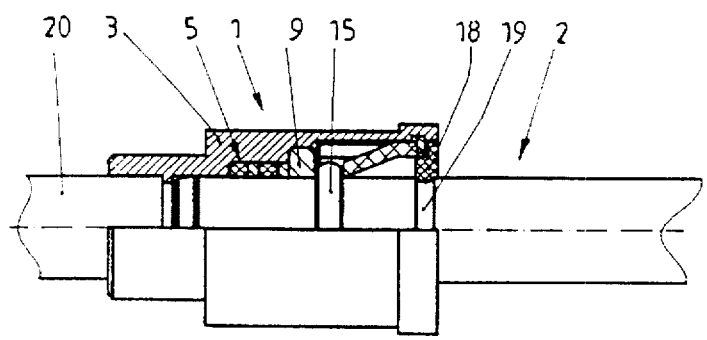
FIG. 8 shows a representation of the quick-action coupling in which the sleeve is soldered onto a pipe.

FIG. 8 shows once again the coupled position between nipple 2 and sleeve 1. Here, the housing 3 of the sleeve 1 is connected in a pressure-tight manner of the pipe 20 with the aid of a solder connection.

Figure 9:
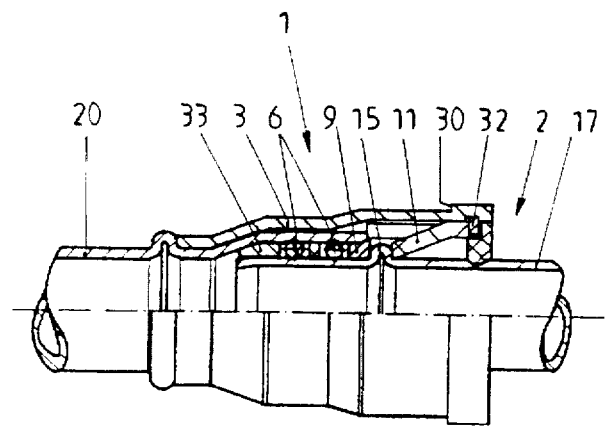
FIG. 9 shows an embodiment of the quick-action coupling in which the sleeve is connected to a pipe solderlessly.

In the case of the embodiment of the quick-action coupling according to FIG. 9, the pipe 17 merges at its front end, in a shaped manner, into the nipple 2. The pipe 20 is also designed by shaping such that a pipe section can be fitted on as the housing 3 of the sleeve 1. Here too, seals 6 are again provided. This set of seals 5 comprising seals 6 and spacers 7 is accommodated between a shaped piece 33 and the supporting ring 9. The bead 15 is formed by a shaping on the pipe of the nipple 2. Here too, it can be seen that the set of seals 5 is not subjected to loading by forces acting externally between nipple 2 and sleeve 1. Just as in the case of the preceding exemplary embodiments, the transfer of forces between sleeve 1 and nipple 2 takes place via the supporting ring 9. It can also be seen that the inside diameter of the supporting ring 9 corresponds to the outside diameter of the front end 16 of the nipple 2, so that the nipple is supported by its free end 16 between the supporting ring 9 on the one hand and the shaped piece 33 on the other hand. Bending forces are thus absorbed at two locations opposite each other.

Figure 10:
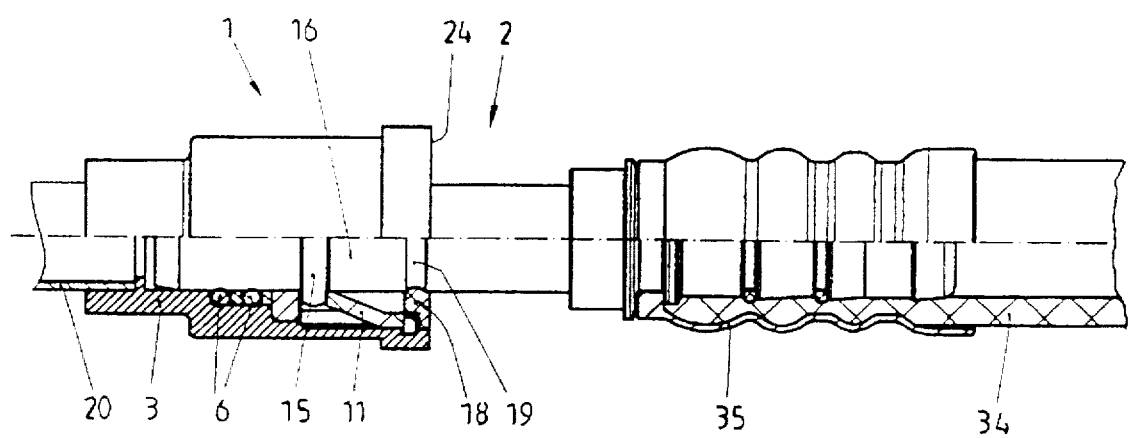
FIG. 10 shows a representation of the coupling in which the nipple is connected to a flexible tube and the sleeve is connected to a pipe.

FIG. 10 shows an embodiment in which the sleeve 1 is connected to the pipe 20 by soldering. The nipple 2 is connected to a connected-up flexible tube 34 by means of a ferrule 35. The relative arrangement of the other parts is unchanged. It can be seen from FIG. 10 that the nipple 2 leaves between the end face 24 of the sleeve 1 and the ferrule 35 a section on which the dust-protection ring 18 can be axially displaced, in order that here too the use of the releasing tool 25 is possible, as shown and described with reference to the preceding exemplary embodiments.

Figure 11:
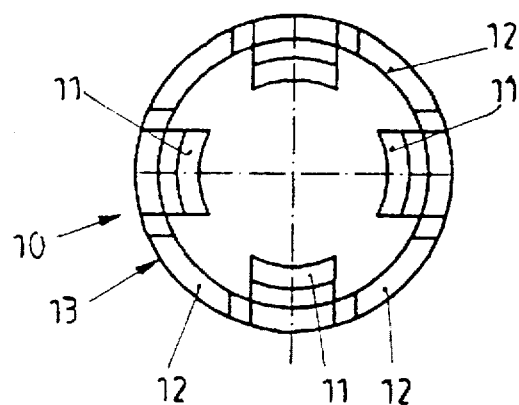
FIG. 11 shows an end elevation of the cage.
Figure 12:
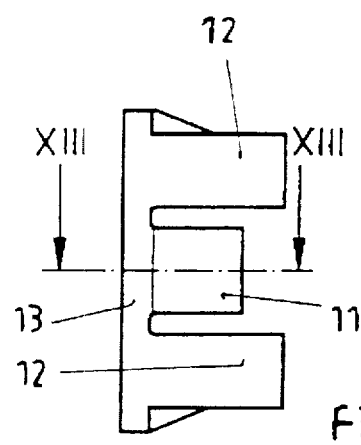
FIG. 12 shows a side elevation of the cage.
Figure 13:
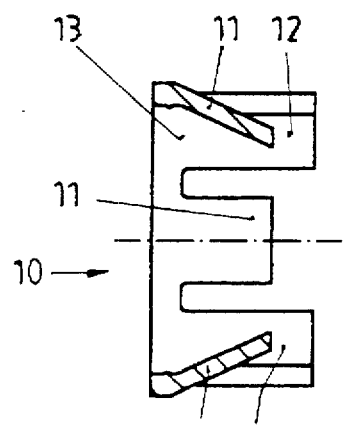
FIG. 13 shows a section according to the line XIII—XIII in FIG. 12.

FIGS. 11 to 13 illustrate once again the cage 10, which is designed and representated her as a plastics moulding. It has an annular basic body 13, from which towards one side, seen axially, the retaining fingers 11 and the retaining fingers 12 extend.

Figure 14:
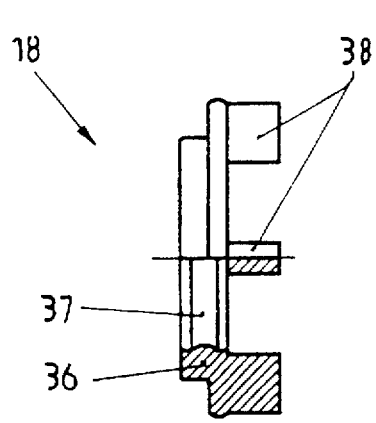
FIG. 14 shows a representation of the dust-protection ring.
Figure 15:
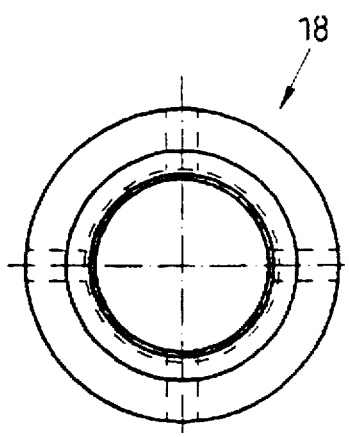
FIG. 15 shows a front elevation of the dust-protection ring according to FIG. 14.

FIGS. 14 and 15 show the dust-protection ring 18 in an individual representation. This ring too has a ring-like basic body 36 of elastomeric material, which has a projecting bead 37 which is matched in its shaping to the shaping of the depression 19. Continuations 38, for example arranged offset with the respect to one another by 90°, serve for easier grasping of the dust-protection ring 18 when the latter terminates flush with the end face 24 of the sleeve 1 in the locked position, as is represented in the preceding drawings. With the aid of the continuations 38, the dust-protection ring 18 can easily be grasped and thus drawn progressively out of the depression 19 and consequently be moved axially on the nipple 2.

I claim:

1. Quick-action coupling for connecting ends of first and second refrigerant conduits comprising a connector sleeve (1) for connection to end of a first conduit, a nipple (2) which is telescopically received into said connector sleeve for connection to and end of a second conduit, said connector sleeve (1) including a set of annular seals (5) for surrounding said nipple (2) and having at least one seal (6) of elastomeric material, and a locking device (10, 11, 15) for coupling between said connector sleeve (1) and said nipple (2), said locking device including a bead (15) on the nipple (2) projecting radially outwardly from said nipple and a cage (10) mounted in the connector sleeve (1) including retaining fingers (11) converging from said connector sleeve (1) toward said nipple (2) which open out to pass said bead (15) and collapse to form a cage (10) to engage behind said bead, and a releasing tool (25) for opening out the retaining fingers (11) of the cage (10), said tool fitted onto said nipple (2) and movable in the direction of the connector sleeve (1), characterized in that said releasing tool (25) includes a release sleeve surrounding said connector sleeve (1) and has a radially inwardly directed retaining collar (29) serving as a stop, a radially outwardly projecting counter-stop (30) on the outer circumference of said connector sleeve (1) for engaging said retaining collar (29) of said release sleeve, said releasing tool (25) including an axially extending annular lock release collar (31) surrounding said nipple (2) for axially engaging and radially expanding said converging retaining fingers (11), which collar (31) forms with said projecting bead (15) of the nipple (2) a stop for limiting the drawing-off movement of said nipple (2) when releasing the quick-action coupling, a dust-protection ring (18) of elastomeric material surrounding said nipple (2) and moveable along the nipple (2), said nipple (2) including a circumferential depression (19) onto which said dust-protection ring (18) is displaceably fitted.

2. Quick-action coupling according to claim 1, characterized in that the retaining fingers (11,12) on the cage (10) extend in one axial direction, and a securing ring (32) releasably locks said cage (10) and said set of seals (5) in said connector sleeve (1).

3. Quick-action coupling according to claim 1, characterized in that, axial fixing of said set of seals (5) and limiting the pushing-in movement of the nipple (2) into the connector sleeve (1) is provided by a supporting ring (9) having an outside diameter larger than an outside diameter of said set of seals (5).

4. Quick-action coupling according claim 3, characterized in the said supporting ring (9) further comprises a shoulder (8) and an inside diameter wherein said inside diameter is matched to the outside diameter of the nipple (2) ahead of the bead (15).

5. Quick-action coupling according to claim 1 characterized in that the dust-protection ring (18) is disposed in the depression (19) such that, in the coupled state, it enters into a pushing-in space (23) formed between the connector sleeve (1) and nipple (2) and is flush with an end face of the connector sleeve (1).

6. Quick-action coupling according to claim 1, characterized in that the dust-protection ring (18) is disposed in the depression (19) such that, when coupled said dust-protection ring (18) is flush with said end face of said connector sleeve (1) and prevents particles from penetrating a space (23) formed between connector sleeve (1) and nipple (2).

7. Quick-action coupling according to claim 5 or 6, characterized in that the dust-protection ring (18) has axial projections (38) to facilitate grasping and removal of said dust-protection ring (18) out of the depression (19).

8. Quick-action coupling according to claim 1, characterized in that the sleeve-like axially expanding lock release collar (31) of the releasing tool (25) has at its free end a radially extending stop face (39).

9. Quick-action coupling according to claim 1, characterized in that the releasing tool (25) is made up of two half-shell bodies (26,27).

10. Quick-action coupling according to claim 2, characterized in that the cage (10) is plastics molding.

* * * * *